March 4, 1930.    M. M. AUSTIN ET AL    1,748,938
MEANS FOR SOLDERING CONTACT POINTS
Filed June 27, 1928    Sheet 1
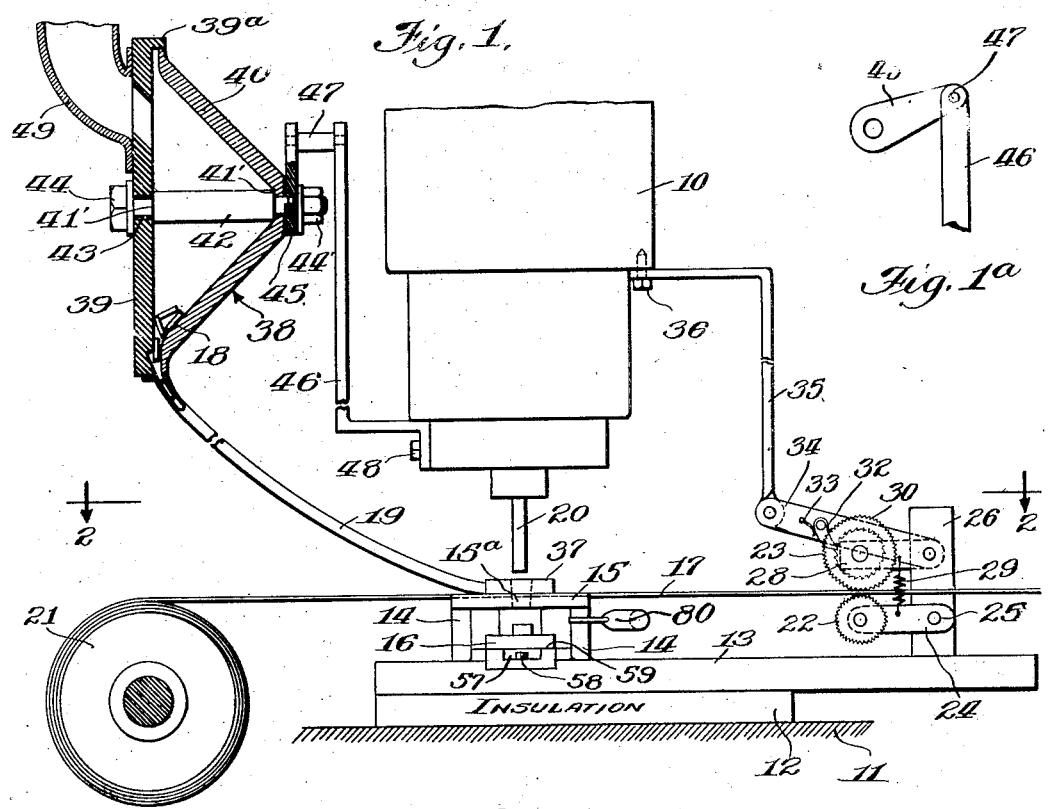
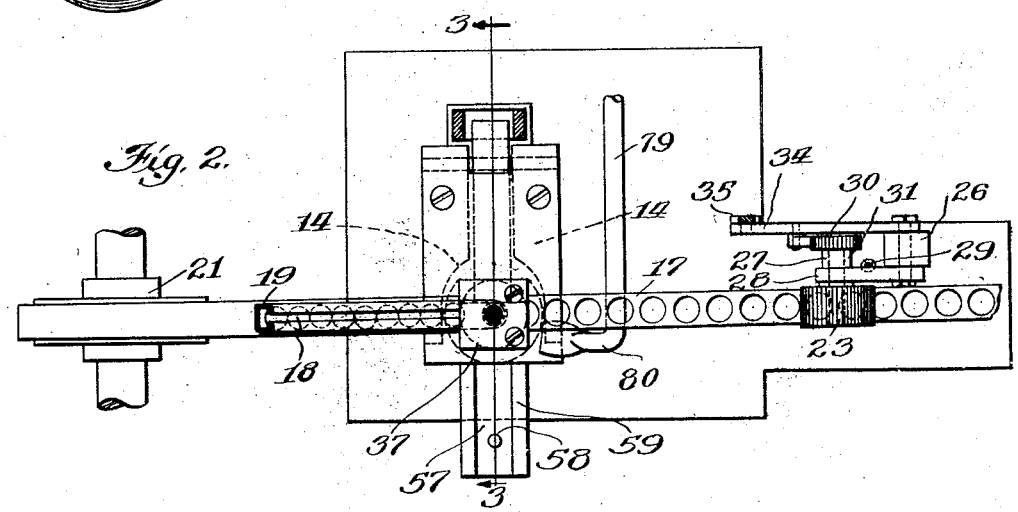
Inventors
Miner M. Austin
LeRoy J. Warner
By Williams, Bradbury,
McCaleb & Hinkle    Attys.

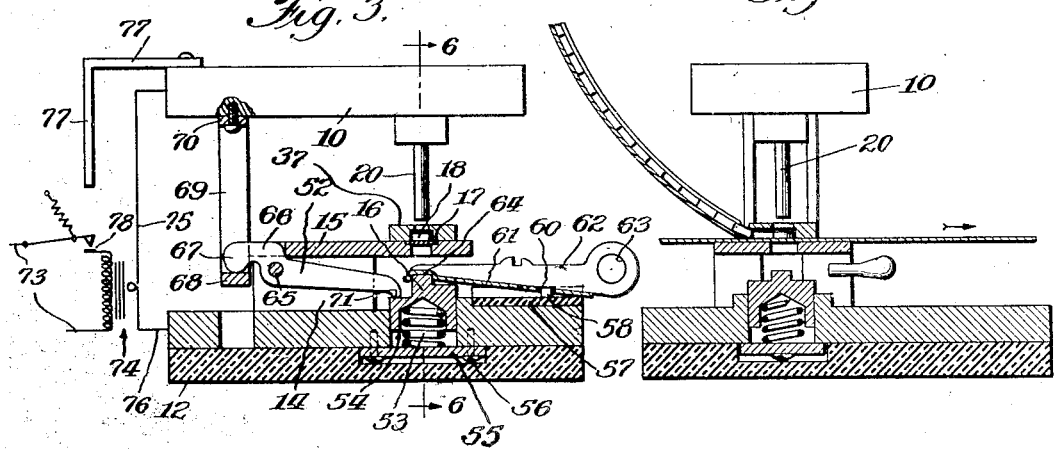
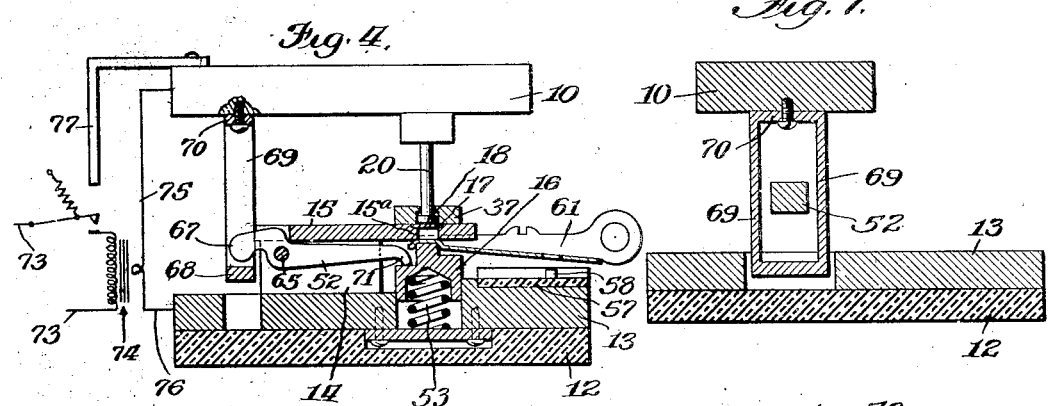
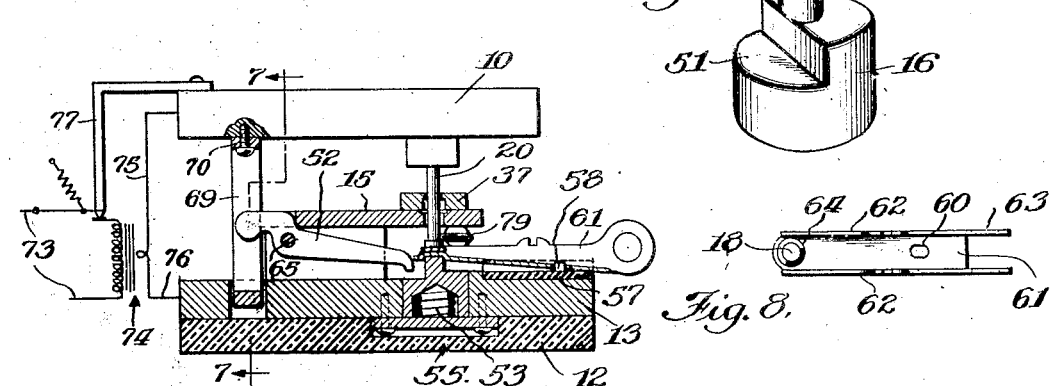

Patented Mar. 4, 1930

1,748,938

UNITED STATES PATENT OFFICE

MINER M. AUSTIN, OF WAUKEGAN, AND LE ROY J. WARNER, OF NORTH CHICAGO, ILLINOIS, ASSIGNORS TO FANSTEEL PRODUCTS COMPANY, INC., OF NORTH CHICAGO, ILLINOIS, A CORPORATION OF NEW YORK

MEANS FOR SOLDERING CONTACT POINTS

Application filed June 27, 1928. Serial No. 288,650.

Our invention relates to an automatic soldering process for centering tungsten contact points on the raised portions of breaker arm supports and soldering said contact points thereto. It is imperative that contact points be accurately centered and heretofore this has been accomplished by a tedious manual process wherein a wafer of a soldering alloy and a tungsten disc were placed in order upon the struck-out portion of the breaker arm after which the assembly was carefully transferred to a soldering furnace where the soldering alloy was fused. Centering of the disc was accomplished by the surface tension of the fused alloy or manually by jigs or fixtures.

An object of our invention is to provide a means for automatically accomplishing what has heretofore been done by hand.

A further object of our invention is to provide a means for increasing the uniformity of breaker arms provided with contact points.

A further object is to eliminate defects due to manual manipulation and to increase the speed and accuracy of the manufacture.

A further object is to decrease the cost of manufacture.

A further object is to provide an improved apparatus for accomplishing these ends.

Other objects will be apparent as the detailed description of our invention proceeds.

The invention may be generally characterized as a punch press in which contact points are placed immediately above a ribbon of soldering alloy on a die positioned above a lower electrode which supports the raised portion of the breaker arm. When the punch comes down on the contact point, it causes the contact point to shear a disc from the ribbon of soldering alloy and to center the contact point and soldering material on the raised portion of the breaker arm. Continued downward motion of the punch closes an electrical circuit which fuses the contact point in situ, preferably in an atmosphere of hydrogen, to prevent oxidation or sputtering.

The invention will be better understood from the detailed description which follows, in which we have specifically set forth a preferred embodiment of our invention.

In the drawings which form a part of this specification, and in which similar reference characters refer to similar parts throughout the several figures, Fig. 1 is a diagrammatic front view of our apparatus illustrating the punch and the solder ribbon and contact point supply;

Fig. 1ª is a detail along the lines a—a of Fig. 1;

Fig. 2 is a horizontal section along the lines 2—2 of Fig. 1;

Fig. 3 is a vertical section along the lines 3—3 of Fig. 2 showing the initial position of the breaker arm;

Fig. 4 is the same section as shown in Fig. 3 with the punch press in intermediate position;

Fig. 5 is the same vertical section showing the punch press in its final position with the electrical circuit being closed and the contact point being fused to the breaker arm;

Fig. 6 is a section along the lines 6—6 of Fig. 3;

Fig. 7 is a section along the lines 7—7 of Fig. 5;

Fig. 8 is a top plan view of the breaker arm, and

Fig. 9 is a perspective of the spring pressed cylinder which acts as a lower electrode.

In Fig. 1, we have diagrammatically represented a punch press having a movable element or punch 10 and a table 11 which is fixed relative to said punch. An insulation base 12 on this table supports a metal plate 13 which may be of copper. Rigidly fixed to the metal plate are supports 14 to which is secured a die plate 15. The supports 14 are of non-conductive material and they insulate the lower electrode from the punch plate and other parts of the apparatus during the fusing step. Beneath the die plate 15 and slidably mounted in the metal plate 13 we provide a metal cylinder 16 which is also preferably of copper or copper alloy.

The die plate is provided with a channel for receiving a ribbon 17 of soldering or welding alloy and tungsten contact points 18 are directed above the soldering ribbon by a guide 19 so that the electrode 20 on the punch presses directly on the contact point which shears a disc of solder from the ribbon and positions it on the raised portion of the breaker arm as will be hereinafter described.

The soldering alloy preferably consists of about 65% silver, 30% copper, and 5% nickel, although it is obvious that any suitable alloy might be used for this purpose.

The ribbon is slightly wider than the contact point so that the waste strip may be removed by suitable rollers and the thickness of the ribbon, which will necessarily vary with different alloys, is about .004 inch. The ribbon is preferably mounted on a spool 21 and is drawn across the die plate by means of serrated rollers 22 and 23. Roller 22 is preferably mounted on an arm 24 secured by suitable screws 25 to an upright block 26. Roller 23 is fixed to a stub shaft 27 which is rotatably mounted in arm 28 which is in turn pivotally mounted on the block 26, as shown in Figs. 1 and 2. Arm 28 is urged toward arm 24 by a suitable spring 29 whereby the serrated rollers may firmly grip the ribbon 17 to pull it through the die.

A ratchet wheel 30 is fixed to the other end of stub shaft 27 and is spaced from the arm 28 by a loose sleeve 31. A dog or ratchet 32 is urged against the ratchet wheel 30 by means of a spring 33, said dog being mounted on an arm 34 which is pivoted at one end to block 26 and at the other end to an L-shaped member 35 which is secured to the movable head or punch 10 by a screw 36.

It will be obvious that these elements may be so designed that each reciprocation of the head or punch will cause the desired amount of forward motion of the ribbon. The dog 32 may be designed to disengage the teeth of the ratchet wheel 30 when the proper amount of ribbon has been fed (due to the fact that arm 34 is pivoted to block 26 instead of to stub shaft 27).

The contact points, as above stated, are directed above the soldering ribbon by the guide 19 and the pressure of the column of contact points in this guide effectively maintains a continuous feed and forces the end contact point against the stop member 37 to accurately position said contact point in alinement with the aperture or opening in the die plate 15. The other end of the guide 19 is in communication with the receptacle 38 which contains the contact points 18.

This receptacle consists preferably of a circular base plate 39 provided with an annular upturned flange 39ª and an inverted cone 40, the base of which fits within the flange 39ª and is held slightly spaced from the plate 39 by shoulders 41 and 41' on a bolt 42, one end of the bolt being surrounded by a bearing sleeve 43 and rotatably secured to the plate 39 by a nut 44 and the other end extending through an aperture in an arm 45 which is clamped against the apex of the cone by a nut 44'.

The arm 45 is pivoted to an L-shaped member 46 by a suitable pin 47, said member being secured to the movable head or punch by a screw 48. The fixed plate of the receptacle is provided with a hopper 49 which communicates with the receptacle through an aperture in the base plate whereby contact points may be fed into the space between the cone and the plate.

The operation of this contact point feeding means will be evident from the above description and from the detail shown in Fig. 1ª, that is, the reciprocation of the head rocks the arm 45 which rotates the cone 40 against the fixed plate 39. The base of the cone is provided with notches, serrations or roughened portions which tend to stir the contact points around, to position them against the base plate and to prevent the jamming or sticking of these points at the discharge opening of the receptacle.

The column of tungsten discs descending through the feed track should be heavy enough to force the lowermost disc quickly into position above the die and to hold it suspended between the positioning stop and the next disc.

Our improved welding process is most clearly shown in Figs. 3 to 5.

The base 12 of insulating material supports the metal plate 13 in which is slidably mounted the cylinder 16 (see Fig. 9). This cylinder is provided with a projection 50 adapted to fit the offset or cup portion of the breaker arm and with a flat cut away portion 51 adapted to co-act with the rocking cam lever 52 as will be hereinafter described.

The cylinder is provided with a cylindrical bore 53 to hold a coil spring 54. This spring may bear against the insulating base 12 or it may bear against a cover plate 55 secured to the metal plate 13 by suitable screws 56, this being preferable because it gives better electrical contact when the cylinder is forced against the cover plate.

A guide 57 of insulating material is preferably mounted on the metal plate immediately in front of the sliding cylinder, said guide being provided with a pin 58 and side flanges 59 (see Fig. 2). The pin is adapted to co-act with the aperture 60 in the web portion of the breaker arm (see Fig 8) while the flanges 59 of the guide co-act with flanges 62 of the breaker arm to center it.

The breaker arm is of the type commonly used in automobile ignition systems and comprises web portion 61, side flanges 62 provided with apertures 63, and an upturned portion 64 in the web to which is soldered contact point 18.

The rocking cam lever 52 is pivotally mounted on a pin 65 between support members 14, the upper part 66 of said rocking cam lever being substantially parallel to the die plate 15. One end of this lever is provided with a cam face 67 adapted to roll on the flat portion 68 forming a base of a rectangular ring 69 secured to the moving head 10 by a suitable screw 70. The other end of the rocking cam lever has a cam surface 71 adapted to bear against the cut away portion 51 on the sliding cylinder.

A source of electric current 73 leads to a transformer 74 for delivering low voltage high amperage current to solder the contact point. One side of the secondary is connected by wire 75 to the moving head 10 and the other side is connected by wire 76 to the metal plate 13. A bracket 77 on moving head 10 is adapted to close contact switch 78 for momentarily closing the primary circuit when the moving head nears its lowermost position. The switch diagrammatically illustrated at 78 is designed to automatically break the circuit after a predetermined interval to allow the fused metal to set before the pressure is released which holds the contact point pressed against the breaker arm. In other words, the switch operation is so timed that the current is not applied till the breaker arm, welding wafer, and tungsten disc are firmly pressed between the electrodes, and is turned off again before this pressure is removed. The lower electrode is preferably insulated from the rest of the machine, but any suitable insulation system may be used.

Since the welding temperature is very high and might cause oxidation of the exposed parts, we prefer to perform this operation in an atmosphere of hydrogen which is supplied through a pipe 79 and nozzle 80 which directs a stream of hydrogen against the contact point during the welding process.

The operation of our invention may be defined as follows:

With the head in the uppermost position, the rocking cam lever is held in the position shown in Fig. 3 by the bottom 68 of ring 69 bearing against the cam face 67, forcing cam face 71 against the cut surface 51 of the slidable cylinder whereby the spring 54 is held partially compressed. The breaker arm is placed in the guide 57, being accurately spaced by flanges 59 and pin 58 so that the raised portion 64 is immediately above the projection 50 of the cylinder 16.

As the head moves downwardly, the rocking cam lever rotates counterclockwise and permits the spring 54 to expand and force the raised portion or table of the breaker arm against the bottom of the die plate 15 and in alinement with the aperture 15ª.

As the head continues in its downward movement, the electrode 20 comes down on contact point 18 and causes it to shear a wafer out of the soldering alloy ribbon. It will be apparent that the tungsten contact point itself is the element which cooperates with the die plate 15 in this shearing operation (see Fig. 4).

Continued downward movement of the punch or head forces the solder alloy disc and contact point against the raised spot on the breaker arm and the resistance offered by spring 54 holds these parts in fixed relation during the downward movement of the breaker arm.

The ring 69 is spaced from the plate 13 to avoid short circuiting and the lever 52 is held away from the lower plate 13 and cylinder 16 by a stop surface bearing against the end of die plate 15.

When the punch approaches its lowermost position, bracket 77 closes contact switch 78 and closes the primary circuit through transformer 74. A current of about 2 volts and 500 amperes is induced in the secondary which heats the contact point and the raised portion of the breaker arm to a bright red heat and fuses these elements together by means of the intermediate soldering alloy. During the fusing step, a stream of hydrogen is directed against the heated parts to avoid possible oxidation and/or discoloration of the exposed metal parts.

The electrode 20 is preferably of tungsten although molybdenum or other suitable metals may be used which will not pit or otherwise deleteriously affect the tungsten contact point in this fusing step.

If the solder ribbon is of proper composition and thickness and the above process is properly timed, the breaker arms can be manufactured which require no subsequent treatment. Any drops of solder or discolored portions may be removed if the proper precautions have not been taken, and in some circumstances it may be advisable to treat the finished product by an annealing process.

We contemplate that many changes may be made in the apparatus for accomplishing the process which we have outlined. For instance, relative motion between cylinder 16 and punch press 10 may be brought about by properly designed cams, other means may be devised for centering the contact point and welding wafer above the struck-out portion of the breaker arm, other devices may be used to cut the welding wafers from the ribbon, etc.

While we have described a preferred embodiment of our invention, it is understood that we are not limited to the details described therein except as defined by the following claims.

The term "breaker arm" as used in these claims is hereby defined as any support to which a contact point or similar element is welded, and it expressly includes screws, rivets and other supports which are now common in the art. The "raised portion" is that portion of the support to which the element is to be welded.

We claim:

1. Soldering apparatus comprising a punch, a die provided with an aperture in alignment with said punch, an electrode spaced beneath said die in alignment with said aperture, means for moving the lower electrode toward and away from said die, an electrical connection from said punch to a power source whereby said punch acts as an upper electrode, an electrical connection from the lower electrode to said power source, and means for controlling current flow in said connections in accordance with the position of said punch.

2. Soldering apparatus comprising a die provided with an aperture, a punch on one side of the die aligned with said aperture, an electrode on the opposite side of the die also aligned with said aperture, resilient means for urging said electrode toward said die, means for holding said electrode away from the die while the punch is in its uppermost position and for permitting the resilient means to urge the electrode against the die when the punch is lowered.

3. Soldering apparatus comprising a lower electrode, a plate provided with an aperture aligned with said electrode, an upper electrode also aligned with said aperture, means for positioning a tungsten contact point above a solder disc in said aperture, means for moving said lower electrode to hold the raised portion of a breaker arm against the plate in alignment with the aperture whereby the descending upper electrode forces the contact point and solder alloy against the raised portion of the breaker arm and holds these parts in fixed position for welding.

4. Soldering apparatus comprising a relatively fixed plate provided with an aperture, relatively movable electrodes above and below said aperture and in alignment therewith, means for moving the lower electrode against the plate during the initial downward movement of the upper electrode, electrical connections connected to said relatively movable electrodes and to a power source respectively, and means for controlling the current flow in said connections from said source to said electrodes in accordance with the position of the upper electrode.

5. Soldering apparatus comprising a fixed table, a die plate provided with an aperture mounted above said table, a lower electrode movable with respect to said table and in alignment with said aperture, means mounted above said table for centering a breaker arm with its raised portion on said lower electrode, an upper electrode, means for urging said lower electrode against the plate to position the raised portion of the breaker arm below the aperture during the initial downward movement of the upper electrode, means for positioning a contact point and a solder disc in said aperture whereby the continued downward movement of the upper electrode accurately positions the contact point and solder disc on the raised portion of the breaker arm and holds these elements in fixed relation while the lower electrode is forced down to soldering position.

6. Soldering apparatus comprising a fixed plate provided with an aperture, upper and lower electrodes in alignment with said aperture and movable relative to said plate, means for positioning a contact point above a solder disc in said aperture, means for positioning the raised portion of a breaker arm on the lower electrode, means for holding said raised portion against the plate whereby the downward movement of the upper electrode forces the contact point and solder disc against said raised portion, electrical connections from said upper and lower electrodes to a power source; means for continuing the downward movement of the electrodes with the breaker arm, solder and contact points there-between and means whereby said continued downward movement of the electrodes controls the current flow in said connections so that the contact point is soldered on said breaker arm.

7. Soldering apparatus comprising means for automatically centering and holding a contact point against the raised portion of a breaker arm with a solder disc interposed there-between, means for directing a reducing gas against said contact point, electrical connections from said holding means to a current supply source, and means for causing current to flow in said connections when said holding means are in their lower position whereby said contact point is welded to said breaker arm in a reducing atmosphere.

8. A soldering apparatus comprising a fixed table, a die plate mounted above said table and provided with an aperture, a movable punch, means actuated by said punch for positioning a solder ribbon above said aperture and means for aligning a tungsten contact point above said ribbon and in alignment with said aperture whereby the downward movement of the punch causes the contact point to shear a disc from the solder ribbon.

9. A soldering apparatus comprising a fixed table, a die plate mounted above said table and provided with an aperture, a movable punch, means actuated by said punch for positioning a solder ribbon above said aperture, means for aligning a tungsten contact point above said ribbon and in alignment with said aperture whereby the downward movement of the punch causes the contact point to shear a disc from the solder ribbon, a lower electrode movable toward and away from said die plate, means for urging said lower electrode toward the die plate for positioning the contact point and solder disc on the raised portion of the breaker arm, electrical connections from said movable punch and said lower electrode respectively to a power source, and means for electrically connecting and disconnecting one of said elements with said power source.

10. Soldering apparatus comprising a punch table, a die plate provided with an aperture mounted above said table, a vertically reciprocable lower electrode in alinement with said aperture, means for normally urging said lower electrode against the die plate, a rocking cam lever provided with a cam surface bearing against a top surface on said lower electrode, a punch head, an element carried by said punch head to cooperate with another cam surface on said rocking cam lever to hold the lower electrode depressed, an upper electrode carried by said punch head, electrical connections from said upper and lower electrodes to a power source, means for positioning a tungsten contact point above a solder disc in said aperture, whereby on the downward movement of the punch head the rocking cam lever is rotated to permit the lower electrode to be urged against the die plate, the punch forces the contact point and solder wafer through the aperture and against the raised portion of a breaker arm carried by the lower electrode, moves the breaker arm away from the die plate and electrically disconnects said electrodes from said power source, the diameter of the upper electrode being smaller than the diameter of the contact point whereby an air space is provided between the upper electrode and the die plate to prevent short circuiting during the fusing operation.

11. In tungsten contact point soldering apparatus, a lower electrode provided with a cam bearing surface and a support for the raised portion of a breaker arm, means to normally urge said electrode upwardly, a pivoted cam lever having a cam face bearing against said lower electrode, a movable head, an element fixed to said head and provided with a bearing surface and a cam face on said lever adapted to bear against said last-named bearing surface whereby the rocking cam lever holds the lower electrode lowered while the head is in its upper position and allows it to be moved upwardly as the head moves downwardly.

12. Soldering apparatus comprising a punch, a die mounted under said punch to cooperate with it, a lower electrode spaced beneath said die, an electrical connection from said punch to a power source whereby said punch acts as an upper electrode, an electrical connection from said lower electrode to said power source, means whereby the die centers soldering material between said electrodes, and means for controlling the current in said connections in accordance with the position of the punch.

In witness whereof, we hereunto subscribe our names this 19th day of June, 1928.

MINER M. AUSTIN.
LE ROY J. WARNER.